United States Patent [19]

Colville

[11] 4,269,273

[45] May 26, 1981

[54] LAND SURFACING APPARATUS

[76] Inventor: Hume W. Colville, Murray St., Barham, New South Wales, Australia

[21] Appl. No.: 52,284

[22] Filed: Jun. 26, 1979

[51] Int. Cl.$^3$ .................... A01B 63/16; A01B 63/111
[52] U.S. Cl. ................................... 172/397; 172/244; 172/413; 172/762; 172/630; 172/799.5
[58] Field of Search ............... 172/762, 659, 240, 464, 172/175, 318, 413, 397, 414, 244, 767

[56] References Cited

U.S. PATENT DOCUMENTS

| | | | |
|---|---|---|---|
| 1,193,921 | 8/1916 | Pollard | 172/659 |
| 1,220,898 | 3/1917 | Smith | 172/659 X |
| 1,934,488 | 11/1933 | Dempster et al. | 172/762 X |
| 2,218,564 | 10/1940 | Thomas | 172/464 |
| 2,266,625 | 12/1941 | Cundiff | 172/175 X |
| 3,640,346 | 2/1972 | Fueslein | 172/318 |
| 3,935,906 | 2/1976 | Neal et al. | 172/240 X |

Primary Examiner—George J. Marlo
Attorney, Agent, or Firm—Ladas & Parry

[57] ABSTRACT

Land surfacing apparatus, comprising an elongate blade and a towing structure which includes a tow connection portion forward of the blade and which is connected to the blade so that the blade can be towed with its longitudinal dimension transverse to the tow direction while biased by its own weight into engagement with the ground with a longitudinal edge thereof serving as a soil cutting edge and a leading face extending upwardly from the cutting edge. The connection of the tow structure to the blade permits adjustment of the blade through a range of forwardly leaning orientations at which it extends both upwardly as well as forwardly in the tow direction from said cutting edge. The blade is carried by an elongated hollow triangular structure which carries ground wheels mounted on supports extending toward the towing structure, and inboard of opposite ends of the blade. A hydraulic cylinder is operable to effect pivoting of the tow structure and hollow structure and cause the ground wheels to be brought into engagement at an extreme forward leaning movement of the blade.

7 Claims, 3 Drawing Figures 4,269,273

LAND SURFACING APPARATUS

BACKGROUND OF THE INVENTION (1) Field of the Invention

This invention provides a novel type of land surface apparatus the main use of which is to finish or even out a land surface after it has been roughly graded to a required level or slope.

(2) Prior Art

At the present time land surface finishing work is generally carried out with long narrow machines which are difficult to manoeuvre and expensive to produce. The apparatus of the present invention is of simple construction yet can be made to operate over a wider swath than would be possible with conventional machines without an inordinate consumption of power.

BRIEF SUMMARY OF THE INVENTION

According to the present invention there is provided land surfacing apparatus, comprising an elongate blade and a towing structure which includes a tow connection portion spaced laterally of the blade from a central part of the blade for connection to a tow vehicle and which is connected to the blade such that the blade can be towed with its longitudinal dimension transverse to the tow direction while biased by its own weight into engagement with the ground with a longitudinal edge thereof serving as a soil cutting or scraping edge and a leading face extending upwardly from the cutting edge.

Preferably the connection of the tow structure to the blade is such as to permit adjustment of the blade through a range of forwardly leaning orientations at which it extends both upwardly as well as forwardly in the tow direction from said cutting edge. More particularly it is preferred that the range of adjustment should permit the blade to be set so that its front face is inclined forwardly at a general angle of at least 45°.

Preferably, the blade is curved in cross-section so as to be of a curved channel configuration with its front face concave and its connection with the towing structure is such that it is forwardly and upwardly inclined during towing.

The apparatus may further include a wheeled structure movably mounted on the assembly of the blade and tow structure and conditionable to hold the blade clear of the ground for transport of the apparatus. Power means, for example an hydraulic cylinder unit, may be provided so as to be operable to move the wheeled structure relative to the blade and tow structure.

The wheeled structure may be movable to a position in which it is raised out of engagement with the ground for land surfacing operations. Alternatively or in addition, the wheeled structure may have a condition in which the wheel or wheels thereof run on the ground during land surfacing operations. In this case there may be biasing means operating between the wheeled structure and the blade to transfer a part of the weight of the blade to the wheeled structure during land surfacing. Such biasing means may be adjustable to vary the proportion of the blade weight which is transferred to the wheeled structure.

BRIEF DESCRIPTION OF THE SEVERAL VIEWS OF THE ACCOMPANYING DRAWING.

DETAILED DESCRIPTION

Figure 1:
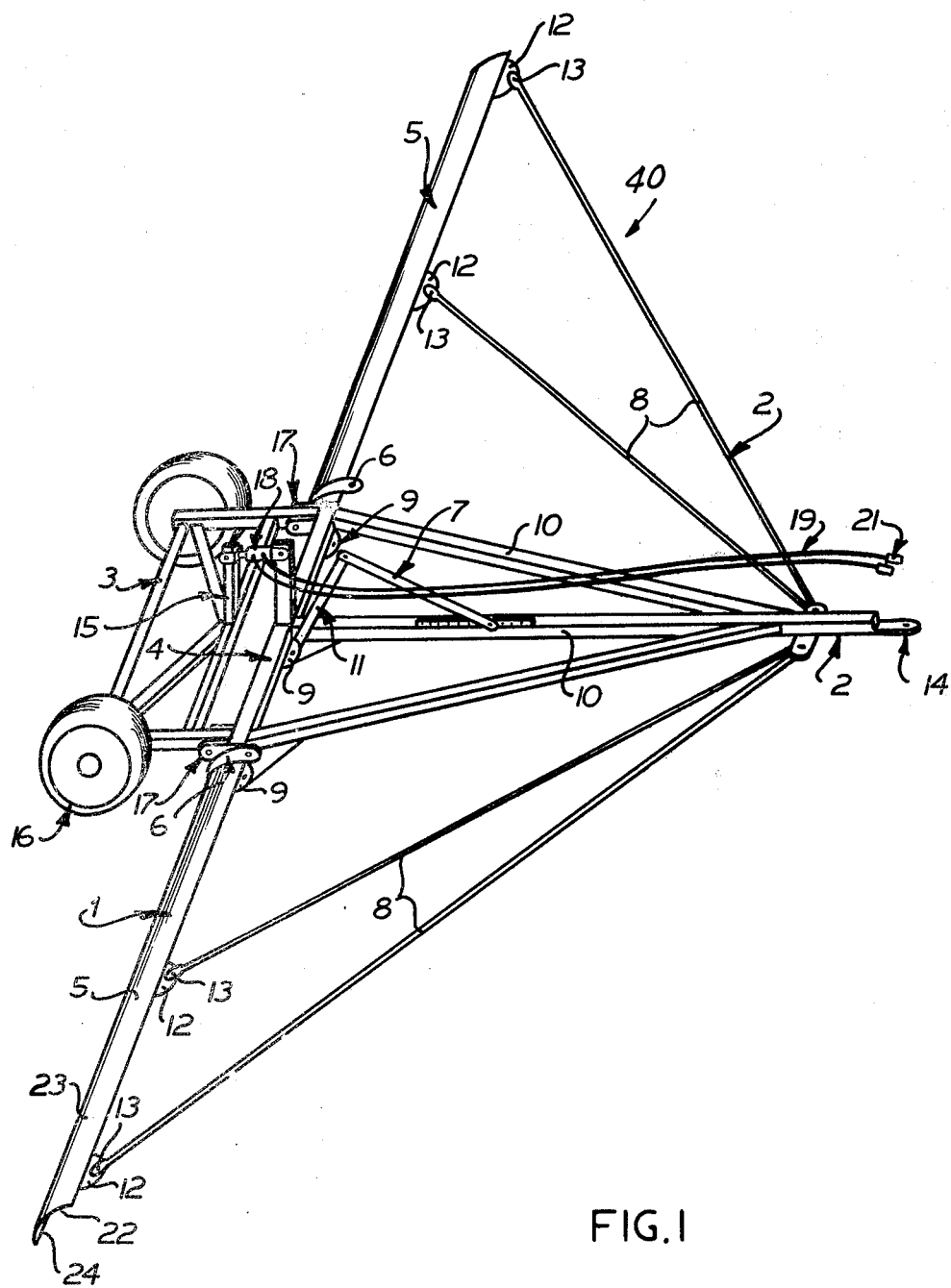
FIG. 1 is a perspective view of an apparatus constructed in accordance with the invention.

The apparatus 40 of FIG. 1 comprises an elongate blade denoted generally at 1, a tow structure denoted generally as 2 and a wheeled structure which is pivotally mounted on structure 2 and is denoted generally as 3.

Blade 1 is formed in three pieces comprising a central piece 4 and a pair of outer pieces 5 which are hinged to the ends of the central piece by hinges 6. When the apparatus is to be used for surfacing operations the outer blade pieces 5 are positioned as shown in the drawings so as to serve as extensions on the central piece 4 to produce a very long straight surfacing blade. As will be explained below, the outer blade pieces 5 can be folded inwardly for transport of the apparatus.

Tow structure 2 comprises a towing arm 10, a central brace 7 and outer braces 8. Towing arm 10 is in the form of a triangular frame made of a central bar and two side bars. It extends forwardly from the mid-part of central blade piece 4 and is connected to that part of the blade by three pivot connections 9 permitting relative pivoting between the blade and the arm about a horizontal pivot axis perpendicular to the arm. Central brace 7 is connected between the upper end of a post 11, standing up from the central blade piece 4, and an anchorage on the central bar of towing arm 10. Outer braces 8 are connected between lugs 12 welded to the blade and suitable anchorages on the forward end of the towing arm. Braces 7 and 8 may be rigid bars or flexible cables. Braces 8 are connected to lugs 12 by pivot connections 13 which are aligned with the pivot connections 9 to enable the orientation of the blade to be varied relative to the towing arm by adjusting the setting of central brace 7 without any need to adjust the outer braces 8.

The forward end of towing arm 10 is formed with an eye 14 for connection with a towing vehicle such as a tractor via a towing pin or post. Eye 14 thus serves as a tow connection portion of towing structure 2 which is spaced laterally and forwardly from the central part of blade 1 whereby the blade can be towed behind a towing vehicle such that its longitudinal dimension is perpendicular to the tow direction.

Wheeled structure 3 comprises a frame 15 carrying a pair of land wheels 16 and is pivotally connected to central blade piece 4 via pivot connections 17. Thus wheeled structure 3 can be raised and lowered relative to the blade. Such raising and lowering movement is effected by means of an hydraulic piston and cylinder unit 18 the cylinder of which is mounted on the blade and the piston of which is connected to the frame 15 of the wheeled structure. Hydraulic piston and cylinder unit 18 is fitted with flexible hydraulic hoses 19 terminating in hydraulic connectors 21 for connection with the hydraulic system of the towing vehicle.

During land surfacing operations, hydraulic piston and cylinder unit 18 may be operated to raise wheeled structure 3 out of engagement with the ground so that blade 1 simply rests on the ground under the influence of its own weight. Alternatively the piston and cylinder unit may be allowed to adopt a floating condition in which the wheels 16 are allowed to run along the ground without supporting any of the weight of the blade. The blade is curved in cross-section so as to have a shallow curved channel configuration with a concave front face 22 and a convex rear face 23. Brace 7 can be adjusted so that when the apparatus is under tow the blade is generally upright but leans forwardly of the tow direction i.e. its front face 22 extends upwardly and forwardly from the lower blade edge 24 which serves as a coil cutting or scraping edge.

As the blade is towed across roughly graded land, soil accumulates in front of the blade and because of the upward and forward inclination of the front face of the blade this build up of soil produces a wedging effect tending to lift the blade. The blade tends to rise and fall so as to maintain a constant volume of moving soil ahead of it. Since the blade is simply supported by its engagement with the ground it cuts off high spots and allows accumulated soil to fall into the low spots in the area of ground over which it passes. This result in a very rapid smoothing action requiring no adjustment or control on the part of the operator and an area extending over a distance several times the length of the blade can be finished very quickly by making several overlapping passes in different directions. The forward inclination of the blade enables soil to pass under the blade very quickly when a low area is traversed at high speed.

It has been found that the apparatus 40 can be fitted with a blade of a length which would not be feasible in conventional levelling equipment yet can be towed by a vehicle of modest power output. For example, it has been found that a blade 40 feet in length can be towed at 10 miles per hour by a tractor of 75 Horsepower and it is expected that blades of more than 100 feet in length could be towed by vehicles of the same power, although at lesser speeds.

When the apparatus 40 is to be transported to or from a site of operation, hydraulic cylinder unit 18 is operated to pivot wheeled structure 3 downwardly about pivots 13 so as to raise the blade clear of the ground. Braces 8 are removed or disconnected from the blade and the outer blade pieces 5 are folded forwardly to produce a relatively narrow wheeled vehicle which can be readily towed.

The angular setting of the blade can be adjusted to suit the condition of the soil encountered and the available power of the towing vehicle. Although in most applications the blade will be set with a marked forward lean there will be occasions when it may be desirable to set the blade in a substantially upright condition. This could be done, for example, during final finishing with loose soil or in the formation of levee banks for flood irrigation by towing the blade in a direction transverse to the levee bank direction and leaving accumulated soil at the required location by raising the blade. When levelling heavy soil using a towing vehicle of modest power output it may be necessary to set the blade at a forwardly leaning angle of 45°. The range of useful settings, in fact, has been found to extend from a slight backward lean angle to a forward lean angle considerably more than 45°, depending on conditions such as mentioned above.

Although for most surfacing operations the apparatus 40 can be towed successfully with the blade simply resting on the ground the apparatus can be further provided with a biasing means acting between the blade and wheeled structure 3 to transfer a part of the weight of the apparatus onto land wheels 16. Specifically such biasing means may take the form of a simple spring counter balance which can be adjustable to suit both soil conditions and the available power of the towing vehicle.

Figure 2:
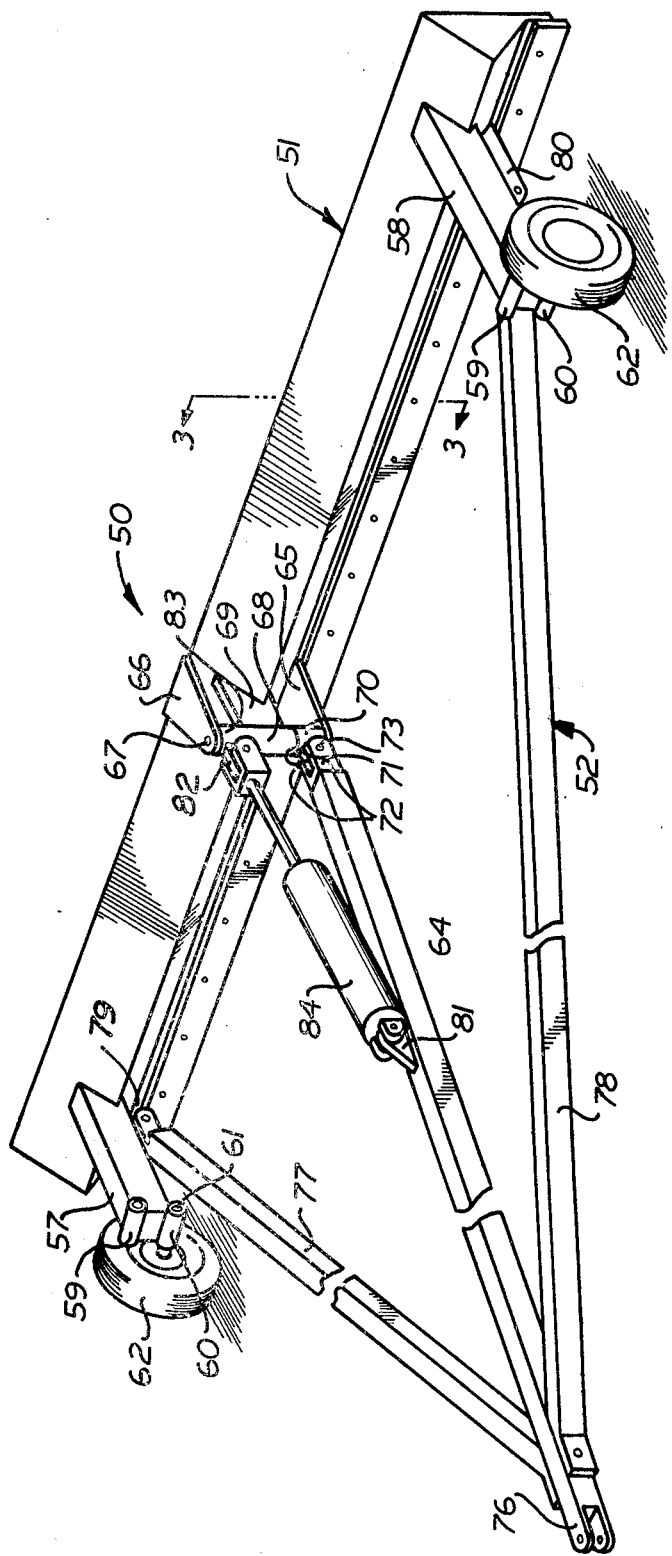
FIG. 2 is a perspective view of another apparatus constructed in accordance with the invention.
Figure 3:
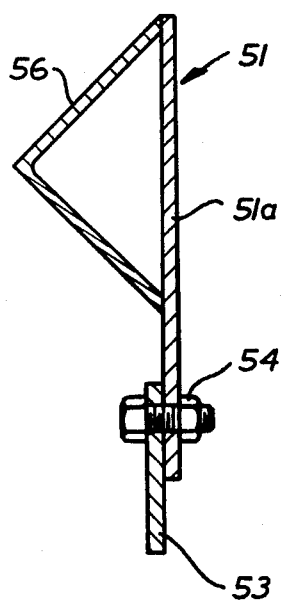
FIG. 3 is a vertical section substantially on the line 3—3 in FIG. 2.

The apparatus 40 has been advanced by way of example only and it could be modified considerably. For example, hydraulic piston and cyinder unit 18 could be replaced by a simple mechanical jack to raise and lower wheeled structure 3. It would also be possible to provide an hydraulic unit which is not only operable to position the wheeled frame for transport but which also can be set to provide a partial transfer of weight to the land wheels during surfacing operations, thus eliminating the need for a separate spring counter balance for this purpose. Although it is preferred that the blade be of curved cross-section it would be possible to use a flat blade provided that its connection with the towing structure is such that it can be set in a forwardly inclined position during surfacing operations. The apparatus 50 illustrated in FIGS. 2 and 3 operates in generally the same way as the apparatus 40 of FIG. 1. It comprises tow structure generally denoted by reference numeral 52 and which is coupled to a blade structure generally denoted by reference numeral 51.

Blade structure 51 is formed from an elongate upright plate 51a which has a blade 53 bolted along its lower edge so as to extend therebelow. This bolting is effected by means of bolts 54 extending through openings in the blade and plate 51a. The blade structure 51 is reinforced by an angle iron member 56 which extends lengthwise of the plate 51a and is welded thereto.

Forwardly projecting wheel supports 57, 58 are welded to the blade structure 51 at locations towards the opposite ends thereof. Each support 57, 58 carries a separate pair of tubular members 59, 60 at respective upper and lower locations and these are arranged to selectively receive an axle 61 and a respective associated wheel 62 carried by the axle. The arrangement is thus such that the axles 61 of the two wheels 62 can be positioned either one in each of the tubes 60 or one in each of the tubes 59 to position the wheels at different heights for a purpose described later.

The tow structure 52 includes a central bar 64 which extends forwardly away from the blade structure 51. It is connected to the structure 51 in a manner permitting substantially universal movement thereof. More particularly, the blade structure 51 has forwardly extending lugs 65, 66 at respective lower and upper locations thereon and a vertical pin 67 is mounted on and carried by these. The pin is further supported midway between its ends by a bearing 68 through which the pin passes and which is mounted to the blade structure 51 by a support plate 69 welded to the bearing and to the blade structure. Between the bearing 68 and support 65 there is provided a further bearing 70 which is freely rotatable on the pin and which carries a forwardly extending lug 71. The rearward end of the central member 64 has two rearwardly projecting lugs 72 and the lugs 71 and 72 are connected together by a pivot pin 73 which passes through each of these. Pin 73 is horizontal so that member 64 can be rotated in a vertical plane about this pin. By virtue of the connection of the lug 71 to the bearing 70, the rear end of the member 64 is also rotatable about the vertical axis of pin 67.

The forward end of member 64 carries a suitable coupling 76 to enable it to be connected to a suitable prime mover such as a tractor for towing. Structure 52 further includes two stay members 77, 78 which are pivotally mounted to member 64 at the forward end thereof and which thence extend in divergent relationship to be connected by pivot pins to forwardly extending lugs 79, 80 on structure 51 adjacent to respective supports 57, 58.

Member 64 carries an upstanding lug 81 towards its rear end and a forwardly extending lug 82 is provided on a further bearing 83 mounted on pivot pin 67 between bearing 68 and plate 66. A hydraulic ram 84 is pivotally connected at one end of lug 81 and at the other end to lug 84 so that it can, by extension or contraction thereof, pivot bearing 83 in a vertical plane about pin 73. This movement results in a relative pivoting action between the tow structure 52 and blade structure 51.

The apparatus 50 is used in an analogous manner to the apparatus 40. That is to say, in use, ram 84 is adjusted so that the blade structure rests on the ground with the blade 53 at a desired angle to the vertical. During this movement the wheels 62 are cleared from the ground. The apparatus is then towed across a ground surface to effect grading as before described. When it is desired to transport the apparatus, the ram 84 can be actuated to bring the wheels 62 into engagement with the ground surface and such that the blade 53 is well clear of the ground. The described variable height positioning of the wheels 62, achieved by inserting the axles 61 into either of the members 59 or 61, is useful insofar as it permits the wheels to be positioned at a high level when the blade is set with a substantial forward lean to enable the wheels to still clear the ground.

It will be appreciated that in the apparatus 50, the function of the wheeled structure 3 is performed by the blade structure 51 itself since this, in this instance, carries the blade 53.

I claim:

1. Land surfacing apparatus, comprising an elongate blade and a towing structure which includes a tow connection portion spaced laterally of the blade from a central part of the blade for connection to a tow vehicle and which is connected to the blade such that the blade can be towed with its longitudinal dimension transverse to the tow direction while biased by its own weight into engagement with the ground with a longitudinal edge thereof serving as a soil scraping edge and a leading face extending upwardly from the scraping edge; said towing structure being pivoted to said blade about a side to side axis of the apparatus generally parallel to said blade and positioned forwardly of said blade in said tow direction, an extensible link being provided between said tow structure and said blade and operable by variation of the effective length thereof to vary the angular relationship, about said axis, between the tow structure and blade thus in use to vary the angle of the blade to the ground; said blade being provided with ground wheels disposed at locations inboard of opposite ends of the blade, said ground wheels being arranged for rotation about a common axis forward, in said tow direction, of the blade, and positioned so as to be clear of the ground during normal land surfacing operation of the apparatus but such that by operation of said extensible link, the angular relationship between the tow structure and blade can be varied to a relationship at which said wheels are brought into contact with the ground to lift said blade from the ground.

2. Land surfacing apparatus, as claimed in claim 1 wherein said extensible link is arranged to permit adjustment of the blade through a range of forwardly leaning orientations at which it extends both upwardly as well as forwardly in the tow direction from said cutting edge.

3. Land surfacing apparatus as claimed in claim 2 wherein said connection of the tow structure to the blade is such as to further permit adjustment of the blade to a rearward leaning orientation at which the blade extends both upwardly as well as rearwardly in the tow direction from said scraping edge.

4. Land surfacing apparatus as claimed in claim 1 wherein said blade is carried by a hollow elongate structure and is removably secured in a position where it extends lengthwise of said hollow structure and depends therefrom.

5. Land surfacing apparatus as claimed in claim 4 wherein said hollow structure carries said ground wheels mounted on supports extending forwardly of the hollow structure.

6. Land surfacing apparatus, as claimed in claim 5 wherein said extensible link comprises a hydraulic cylinder connected to and extending between said hollow structure and said towing structure, said hydraulic cylinder being operable to effect pivoting of the tow structure and hollow structure such that said ground wheels are brought into engagement at an extreme of forward leaning movement of the blade.

7. Land surfacing apparatus, as claimed in claim 6 wherein said hollow elongate structure is in the form of a hollow triangular prism extending along the length of the blade with an upright rear wall and upper and lower forwardly extending walls which respectively slope downwardly and upwardly away from the rear wall to meet forward of said blade, said blade being carried by a downwardly projecting portion of said rear wall.

* * * * *